(12) United States Patent
Smus (10) Patent No.: US 8,803,808 B1
(45) Date of Patent: Aug. 12, 2014

(54) KEYBOARD EVENT DETECTION AND NETWORK EVENT GENERATION

(75) Inventor: Boris Smus, San Francisco, CA (US)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 13/546,494

(22) Filed: Jul. 11, 2012

(51) Int. Cl.
*G06F 3/02* (2006.01)
*G09G 5/00* (2006.01)

(52) U.S. Cl.
USPC .......................................... 345/168; 345/169

(58) Field of Classification Search
USPC .......................................... 345/156, 168, 169
See application file for complete search history.

(56) References Cited

U.S. PATENT DOCUMENTS

| | | | | |
|---|---|---|---|---|
| 8,631,456 B2* | 1/2014 | Reisman | | 725/133 |
| 8,640,183 B2* | 1/2014 | Reisman | | 725/133 |
| 8,646,020 B2* | 2/2014 | Reisman | | 725/133 |
| 8,661,495 B2* | 2/2014 | Reisman | | 725/133 |
| 8,689,273 B2* | 4/2014 | Reisman | | 725/133 |
| 2012/0194551 A1* | 8/2012 | Osterhout et al. | | 345/633 |
| 2012/0212406 A1* | 8/2012 | Osterhout et al. | | 345/156 |

* cited by examiner

*Primary Examiner* — Ricardo L Osorio
(74) *Attorney, Agent, or Firm* — Sterne, Kessler, Goldstein & Fox P.L.L.C.

(57) ABSTRACT

Methods, systems and computer-readable storage mediums encoded with computer programs executed by one or more processors for detecting a keyboard event and generating a network event are disclosed. In an embodiment, an input event generated by a keyboard operatively connected to a computing device is detected. It is determined that the input event corresponds to an actionable input event of a network-based application independent of which local application of one or more local applications is active on the computing device as indicated by an input focus. A location of a visual indicator corresponding to the actionable input event is determined on a visual interface of the network-based application. The visual indicator is selected at the location of the visual interface and corresponding signal is transmit to the network-based application.

21 Claims, 3 Drawing Sheets

KEYBOARD EVENT DETECTION AND NETWORK EVENT GENERATION

BACKGROUND

The embodiments herein relate generally to detecting keyboard events and generating network events.

Certain keyboards have keys that are designated to signal an operating system or particular application to perform a particular function on a computer. For example, some computers have keyboards with designated multimedia keys that work with a local multimedia application operating on the computer. When one of the multimedia keys is selected, the multimedia application will perform whatever function corresponds to the selected multimedia key, such as a play/pause, reverse, or forward function.

In addition to having a local multimedia application operating on a computer, a user will often use a web application to stream or play multimedia as well. However, operating a web-based multimedia application cannot be done using the multimedia keys, even if the commands used to operate the web-based multimedia application are similar to the commands used to operate the local multimedia application. Rather, a user must use a mouse or touchscreen device to select a button on an interface of the web-based multimedia application to perform any desired functions.

BRIEF SUMMARY

In general, one aspect of the subject matter described in this specification may be embodied in a computer-implemented method. As part of the method, an input event generated by a keyboard operatively connected to a computing device is detected. It is determined that the input event corresponds to an actionable input event of a network-based application independent of which local application of one or more local applications is active on the computing device as indicated by an input focus. The computing device is communicatively coupled to the network-based application over a network. A location of a visual indicator corresponding to the actionable input event on a visual interface of the network-based application is determined. A selection of the visual indicator corresponds to signaling the network-based application to perform the actionable input event over the network. The visual indicator is selected at the location of the visual interface, and a corresponding signal is transmit to the network-based application.

Other embodiments of include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present disclosure makes reference to illustrative embodiments for particular applications, it should be understood that embodiments are not limited thereto. Other embodiments are possible, and modifications can be made to the embodiments within the spirit and scope of the teachings herein, and additional fields in which the embodiments would be of significant utility. Further, when a particular feature, structure, or characteristic is described in connection with an embodiment, it is submitted that it is within the knowledge of one skilled in the relevant art to affect such feature, structure, or characteristic in connection with other embodiments whether or not explicitly described.

Multimedia has become an important part of computing in both network-based applications, as well as applications operating locally on a computer or mobile phone. Network-based multimedia applications may stream multimedia (such as videos or music) over a network to a computer for playback on the computer. Local multimedia applications, by contrast, may play multimedia files that are locally stored on a computer. Multimedia playback has become important enough that some computing devices include multimedia keys on keyboards or other input devices that may be used to operate multimedia applications on the computing devices.

The multimedia keys allow users to interact with (e.g., play, pause, forward or reverse, adjust volume, etc.) multimedia files that are played using a local multimedia application, often playing multimedia files that are stored locally on the computing device. For example, pressing the multimedia key play button may cause the local multimedia application to play any one of a cache of songs that are stored on the computer. The multimedia keys used in conventional computing environments, however, are limited to operating local multimedia applications, and do not work with network-based multimedia applications that may be streaming music to a computer or playing multimedia files stored in a cloud network. To operate such network or web-based multimedia applications, a user has to use a mouse or touch screen device to select a button on a visual interface of the network-based multimedia application to perform a desired action.

Figure 1:
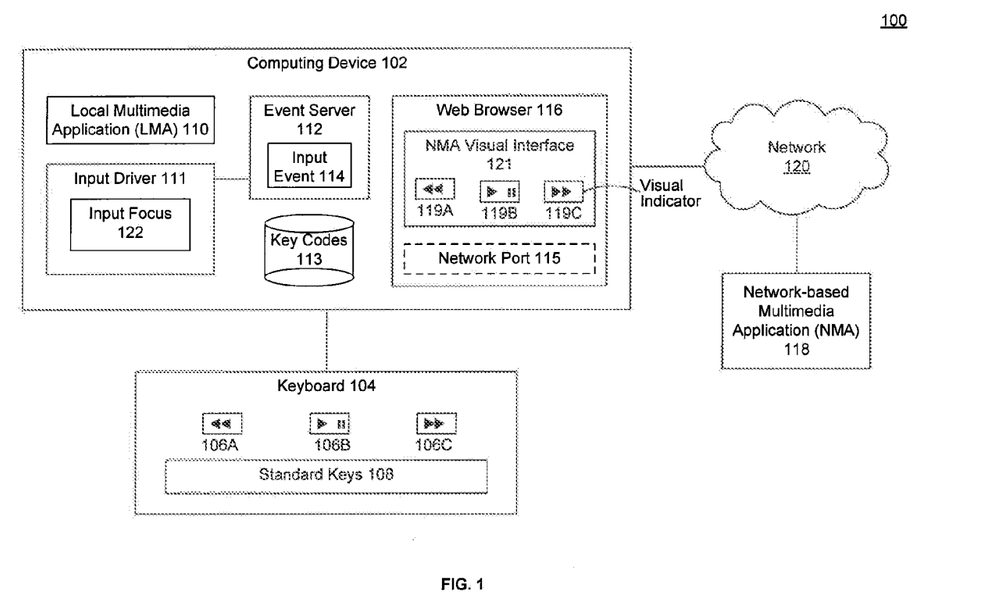
FIG. 1 is a block diagram illustrating a system for detecting keyboard events and generating network events, according to an embodiment.

FIG. 1 is a block diagram illustrating a system for detecting keyboard events and generating network events, according to an embodiment. System 100 detects keyboard events that occur on a computing device, and generates corresponding network events. For example, system 100 can detect an input event 114 corresponding to a selection of a multimedia key 106A-C, and generate a corresponding action on a network or network-based multimedia application (NMA) 118, thus enabling multimedia keys 106 to operate web-based multimedia applications (NMA) 118. Although embodiments herein will be described with reference to a network-based application operable over the Internet, one of skill in the art will recognize that embodiments are not limited to the Internet. Rather, embodiments may be used in any network-based context where content or program functionality is received over any network.

An event server 112 may intercept or receive input events 114 from a keyboard 104. Input events 114 may correspond to selections of one or more key(s) 106, 108 on keyboard 104. Event server 112 may direct an input event 114 to the proper application based on which key(s) 106, 108 were selected (e.g., using key codes 113 that identify the keys 106, 108). For example, event server 112 may provide input events 114 corresponding to selection of multimedia keys 106 to one of a local multimedia application (LMA) 110 or NMA 118. Event server 112 may also provide input events 114 corresponding to a selection of any of standard keys 108 to an input driver 111 for further processing. As will be discussed in further detail below, an input event 114 may be determined to correspond to either LMA 110 or NMA 118 based on an input focus 122 or the type of program currently active on computing device 102. In an embodiment, event server 112 may be a native application that is downloaded onto computing device 102, a plug-in to web browser 116, or a special driver for keyboard 104.

As such, event server 112 may enable multimedia keys 106 of keyboard 104 to interact with NMA 118 by generating network events corresponding to which multimedia key 106 was selected. Such network events may include, for example, activating a visual indicator 119 (e.g., a play button) on a visual interface 121 of NMA 118, based on event server 112 receiving an input event 114 corresponding to the selection of a multimedia key 106 (e.g., a play key 106B) on keyboard 104.

Keyboard 104 may be any input device, including but not limited to a keyboard or keypad. For example, keyboard 104 may be an attached keyboard as often used with a laptop computer, a wired keyboard as often used with a desktop computer, a keyboard that communicates with a computing device 102 over a Bluetooth or other wireless connection, or a touch-screen keyboard. In another embodiment, keyboard 104 may be a deejay mixing device, musical instrument, or other input device.

Computing device 102 may be a computer, mobile phone, tablet computer, or other computing device. Computing device 102 may include any number of processors and memory. Computing device 102 may be operatively connected to keyboard 104 and a network 120.

Keyboard 104 may include various keys, buttons, switches, knobs, or levers. In an embodiment, keyboard 104 may include one or more standard keys 108 and one or more multimedia keys 106A-C. Standard keys 108 may include alpha-numeric keys, and punctuation found on most standard keyboards. Standard keys 108 include, for example, those keys that are often used with word processing applications.

Multimedia keys 106 may include any specialized keys on keyboard 104 designed for use with a particular application on computing device 102, such as a local multimedia application (LMA) 110. In an embodiment, multimedia keys 106 may include a reverse key 106A, a play/pause key 106B, and a forward key 106C. Multimedia keys 106 may also include a volume (up/down) key, or other multimedia keys (such as camera on/off, record/pause, or other keys). In other embodiments, multimedia keys 106 may include keys of keyboard 104 intended for use with specialized applications other than multimedia applications.

As mentioned above, multimedia keys 106 may be used to operate local multimedia application (LMA) 110. LMA 110 may be an application operating on computing device 102 used for multimedia functionality such as playing, recording or editing video or audio media files. For example, LMA 110 may be used to play audio files downloaded from network 120, or may be used to play a DVD inserted in computing device 102. In an embodiment, computing device 102 may not include an installed or active LMA 110. In another embodiment, computing device 102 may include multiple LMAs 110 which can be active at the same time, and which may each be operative with multimedia keys 106.

Network 120 may include any communications, wired, or wireless network connecting two or more computing devices. For example, network 120 may be a private or secured intranet, or the Internet. Network 102 may operatively connect computing device 102 to a server or other computing device hosting web-based multimedia application (WMA) 118.

NMA 118 may be any client-server application that operates over network 120. In an embodiment, NMA 118 may include features or functionality similar to LMA 110. For example, both LMA 110 and NMA 118 may be multimedia applications that play/record audio/video. NMA 118 may provide multimedia functionality over network 120, while LMA 110 operates locally on computing device 102.

In an embodiment, NMA 118 may be a web application. A web application may, for example, be a website or service that operates through a webpage or application accessible via a web browser 116. For example, a user may type in a network address of NMA 118 into an address bar of web browser 116 to access the webpage interface (e.g., visual interface 121) of NMA 118. NMA 118 may, in an embodiment, stream multimedia (such as music or other audio) via web browser 116, and may adjust or select which multimedia to stream next based on a user's indicated preferences or selections. The webpage interface may allow a user to see what multimedia is currently playing and rate or skip the current multimedia and/or select new multimedia to play.

In an embodiment, NMA 118 may include visual interface 121 that has one or more visual indicators 119 associated with functionality corresponding to that of multimedia keys 106. For example, visual interface 121 may include an indication or information as to which action is currently being performed (e.g., play, pause, record), which media file is currently playing or undergoing the action, previous or queued media files that have played or are to be played, and visual indicators 119 for reverse, play/pause, and forward or other operations on a media file or across media files. In another embodiment, NMA 118 may include visual indicator 119 corresponding to only a subset of multimedia keys 106, such as having only a play/pause button.

According to an embodiment visual interface 121 may be a graphical user interface for NMA 118. For example, visual interface 121 may be a Javascript application that is accessed through web browser 116. Through conventional operation, for a user to interact with or select visual indicators 119A-C, a user must use a mouse or other input device (e.g., such as a finger on a touch-screen display) and select the desired visual indicator 119 (e.g., which may appear as a graphical icon such as a button) on visual interface 121. Based on which location of visual interface 121 a user selects, NMA 118 may perform the corresponding action. For example, if a user selects a location within the reverse visual indicator 119A, then NMA 118 may be signaled to perform a reverse operation.

In an embodiment, NMA 118 may stream video or audio to computing device 102 which may be accessed through a web browser 116 or other interface. Web browser 116 may be an application operating on computing device 102 that allows a user to browse, view, download, or otherwise interact with documents accessed over network 120. Web browser 116 may, for example, allow a user to view webpages including a webpage for NMA 118. In another embodiment, web browser 116 may be a local plug-in or other code operating on an application or app on computing device 102 that allows computing device 102 to communicate with NMA 118 over network 120.

Web browser 116 may communicate with network 120 using a network port 115. Network port 115 may enable bi-directional, full-duplex communications over a single connection, such as a TCP connection. Network port 115 may, for example, keep a connection over network 120 open between computing device 102 and NMA 118. Network port 115 may allow for real-time bi-directional communication and may be used by any client-server application. In an embodiment, network port 115 may be a web socket. Network port 115 may allow NMA 118 to stream multimedia for playback on computing device 102, and may allow computing device to interact, in real-time, with the multimedia through an interface of NMA 118. For example, when a user selects a location of a visual indicator 119A-C, the location of the touch may be provided to NMA 118, which may perform the corresponding action in real-time.

Event server 112 may generate network events corresponding to input events 114 detected from keyboard 104. Event server 112 may receive input events 114 corresponding to the selection of a multimedia key 106, and through network port 115 may select or activate visual indicator 119 corresponding to the function associated with the selected multimedia key 106. For example, a receipt of an input event 114 corresponding to play/pause 106B may cause event server 112 to select a play/pause visual indicator 119B on visual interface 121, or otherwise send a signal to web browser 116 to simulate the selection of a location on visual interface 121 associated with or within the bounds of visual indicator 119B.

For example, as mentioned above, visual interface 121 may be a graphical user interface that a user interacts with by selecting various locations on visual interface 121 corresponding to visual indicators 119. Event server 112 may determine the locations of visual indicators 119. Then, for example, upon receipt of input event 114, event server 112 may simulate a selection of a location on visual interface 121 corresponding to one of visual indicators 119A-C (depending on which input event 114 or multimedia key 106A-C was detected). In an embodiment, the location of visual indicators 119A-C may be required information, when visual interface 121 cannot be interacted with by making function calls to the corresponding function (e.g., reverse, play/pause, forward) corresponding to the detected input event 114.

If, however, an input event 114 corresponds to any of standard keys 108, event server 112 may provide the input event 114 to input driver 111 for further processing. Input driver 111 may receive input events 114 corresponding to standard keys 108 from event server 112. Input driver 111 may then provide the input events 114 to whichever application has input focus 122. Input focus 122 may be a component or tool of computing device 102 that indicates which GUI (graphical user interface) element or application receives input event 114. For example, text entered on keyboard 104 or pasted from a clipboard or memory of computing device 102 may be provided to whichever component has input focus 122. Input focus 122 refers to the application that is active or in use by a user of computing device 102, compared to applications that may, for example, simply be running in the background.

In an embodiment, input events 114 for multimedia keys 106 may be provided to a particular application (e.g., LMA 110) independent of which component has input focus 122. For example, a user operating computing device 102 may be actively typing a document on a word processing application which has input focus 122. The user may also have LMA 110 playing music on a background process. As such, input events 114 corresponding to standard keys 108 may be provided to the word processing application that has input focus 122, while input events 114 corresponding to multimedia keys 106 may be provided to LMA 110 even though input focus 122 remains on the word processing application. In another embodiment, a user may have multiple LMAs 110 operating on computing device 102. Then, for example, an input event 114 for a multimedia key 106 may be provided to the LMA 110 that most recently had or has input focus 122.

In an embodiment, event server 112 may use input focus 122 to determine whether input event 114 corresponds to NMA 118. For example, event server 112 may determine whether the active application (as indicated by input focus 122) is a local application or a remote or network-based program. If the currently active program is local to computing device 102, event server 112 may treat input event 114 as having its normal functionality. If the currently active program is received from a remote location (e.g., over network 120), then event server 112 may treat input event 114 as a network command. Or, for example, if either NMA 118 or LMA 110 is not active on computing device 102, then event server 112 may provide input events 114 from multimedia keys 106 to whichever application is active or exists on computing device 102.

Event server 112 may handle the processing of input events 114 corresponding to multimedia keys 106. For example, event server 112 may determine whether an input event 114 for multimedia keys 106 is provided to LMA 110, NMA 118, both, or neither. For example, in an embodiment, event server 112 may only be active when NMA 118 is operating in web browser 116, in which case all input events 114 handled or processed by event server 112 corresponding to multimedia keys 106 may be provided to NMA 118. Or, for example, event server 112 may provide input events 114 to whichever of LMA 110 or NMA 118 most recently had input focus 122. In an embodiment, event server 114 provides all input events 114 corresponding to multimedia keys 106 to NMA 118 when event server 112 and NMA 118 are active, and input driver 111 provides all input events 114 corresponding to multimedia keys 106 to LMA 110 when either event server 112 or NMA 118 is inactive.

In an embodiment, event server 112 uses key codes 113 to determine whether an input event 114 corresponds to standard keys 108 or multimedia keys 106. Event server 112 may further use key codes 113 to determine which network action, if any, to perform with respect to NMA 118 upon the detection of input event 114. For example, if key codes 113 indicate that forward key 106C was selected on keyboard 104, event server 112 may select the location of visual indicator 119C corresponding to a forward action on visual interface 121 in web browser 116. The identification of visual indicator 119C will be described in greater detail below. If however, there is no visual indicator 119C corresponding to a forward action for NMA 118, the corresponding input event 114 may be provided to LMA 110, input driver 111, or discarded by event server 112.

Key codes 113 may be codes that identify which key(s) 106, 108 were pressed on keyboard 104. In an embodiment, key codes 113 may be ASCII codes. Using key codes 113, event server 112 and input driver 111 may determine from input event 114 which key 106, 108 was pressed on keyboard 104. In an embodiment, particular key codes 113 may be associated only with particular applications. For example, the key codes 113 for multimedia keys 106 may only be associated with LMA 110, such that corresponding multimedia key input events 114 are only delivered to LMA 110 (regardless of input focus 122).

As referenced above, event server 112 may determine or otherwise be provided the locations of visual indicators 119A-C on a visual interface 121 of NMA 118 as displayed within web browser 116. For example, event server 112 may determine the location of various buttons (e.g. visual indicators 119) of NMA 118 based on a document object model (DOM) or other source code of NMA 118.

In another embodiment, event server 112 may include or be provided a mapping of the locations visual indicators 119A-C on visual interface 121. For example, event server 112 may be programmed with instructions of which actions to take with respect to NMA 118 based upon the receipt of input events 114 corresponding to multimedia keys 106. The instructions may, in an embodiment, include the location or bounds of visual indicators 119 on visual interface 121. In another embodiment, event server 112 may discover the location of visual indicators 119A-C using the DOMs of various WMAs 118. Then based upon which NMA 118 is operating, event server 112 may perform the proper corresponding action or network event. Event server 112 may, for example, select or simulate a mouse-click or touch operation at the location or within the bounds of the visual indicator 119 corresponding to input event 114.

In an embodiment, key codes 113 for multimedia keys 106 may include an indication as to a location of a corresponding visual indicator 119 of NMA 118 that is to be selected in response to the multimedia key 106. Then, for example, if event server 112 detects that input event 114 corresponds to a selection of play/pause key 106B, event server 112 may signal, through network port 115, a selection of a corresponding visual indicator 119B at a location on visual interface 121. The selection of visual indicator 119B may cause network port 119 to send a signal over network 120 to NMA 118. This may allow a user operating computing device 102 to use multimedia keys 106 to generate network events to control NMA 118.

Figure 2:
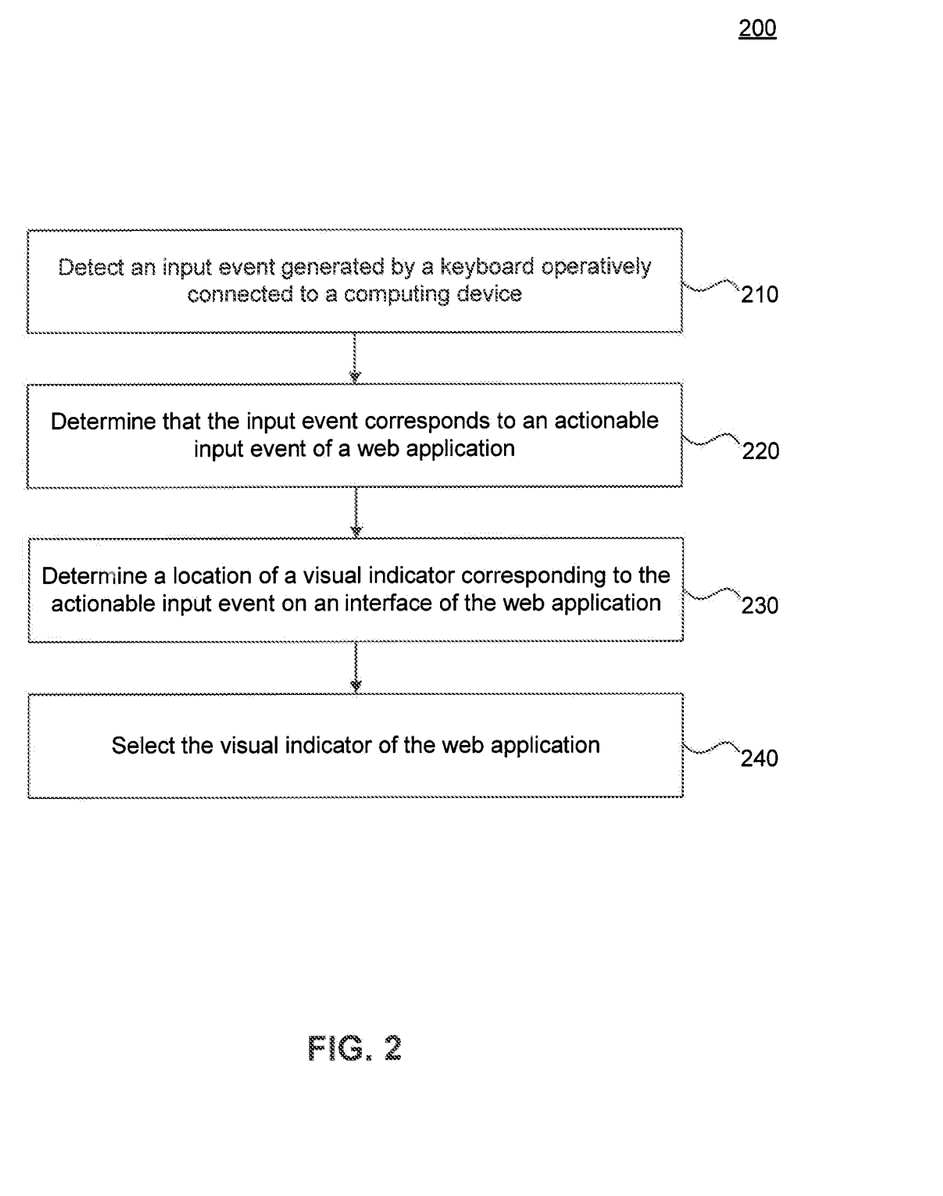
FIG. 2 is a flow chart of a process for detecting keyboard events and generating network events, according to an example embodiment.

FIG. 2 is a flowchart of a method for detecting keyboard events and generating network events, according to an embodiment. The stages of FIG. 2 are described below, in non-limiting examples, with reference to FIG. 1.

At stage 210, an input event generated by a keyboard is detected at a computing device operatively connected to the keyboard. For example, event server 112 may intercept or otherwise receive input event 114 from keyboard 104, prior to input event 114 be received by input driver 111. Keyboard 104 may be a wireless keyboard that communicates over a Bluetooth connection with computing device 102.

In another embodiment, keyboard 104 may be another specialized input device that works with a particular application (e.g., LMA 110) operating locally on computing device 102, but may also be applicable to operating a similar remote or network application (e.g., NMA 118).

At stage 220, it is determined that the input event corresponds to an actionable input event of a web application. For example, event server 112 may determine whether input event 114 corresponds to an action to be performed on NMA 118. Event server 112 may determine, using key codes 113, whether input event 114 corresponds to a selection of multimedia keys 106 or standard keys 108, and whether an action is to be performed with respect to NMA 118 based on input event 114. In an embodiment, if event server 112 determines that input event 114 corresponds to a selection of standard keys 108 or that input event 114 does not correspond to performing an actionable event on NMA 118, event server 112 may provide input event 114 to input driver 111 for regular processing. In another embodiment, the functionality of event server 112 and input driver 111 may operate as a single component.

At stage 230, a location of a visual indicator is determined, the visual indicator corresponding to the actionable input event on an interface of the web application. For example, event server 112 may determine the location of visual indicators 119A-C (e.g., buttons or other visual elements) on visual interface 121 (e.g., a webpage) of NMA 118 corresponding to the actionable input event of a selected multimedia key 106. If, for example, forward key 106C is selected, then event server 112 may determine the location of a corresponding forward visual indicator 119C from the DOM of visual interface 121.

At stage 240, the visual indicator of the web application is selected. For example, event server 112 may transmit input event 114 or a signal corresponding thereto to NMA 118 using network port 115. The signal may simulate a mouse-click or other selection of visual indicator 119 on visual interface 121. For example, based on which multimedia key 106 is selected, as determined from input event 114, event server 112 may simulate the selection at the location of a corresponding visual indicator 119 on visual interface 121. In an embodiment, a signal indicating the selection of one of the visual indicators 119 may be transmit to NMA 118 over network 120.

Figure 3:
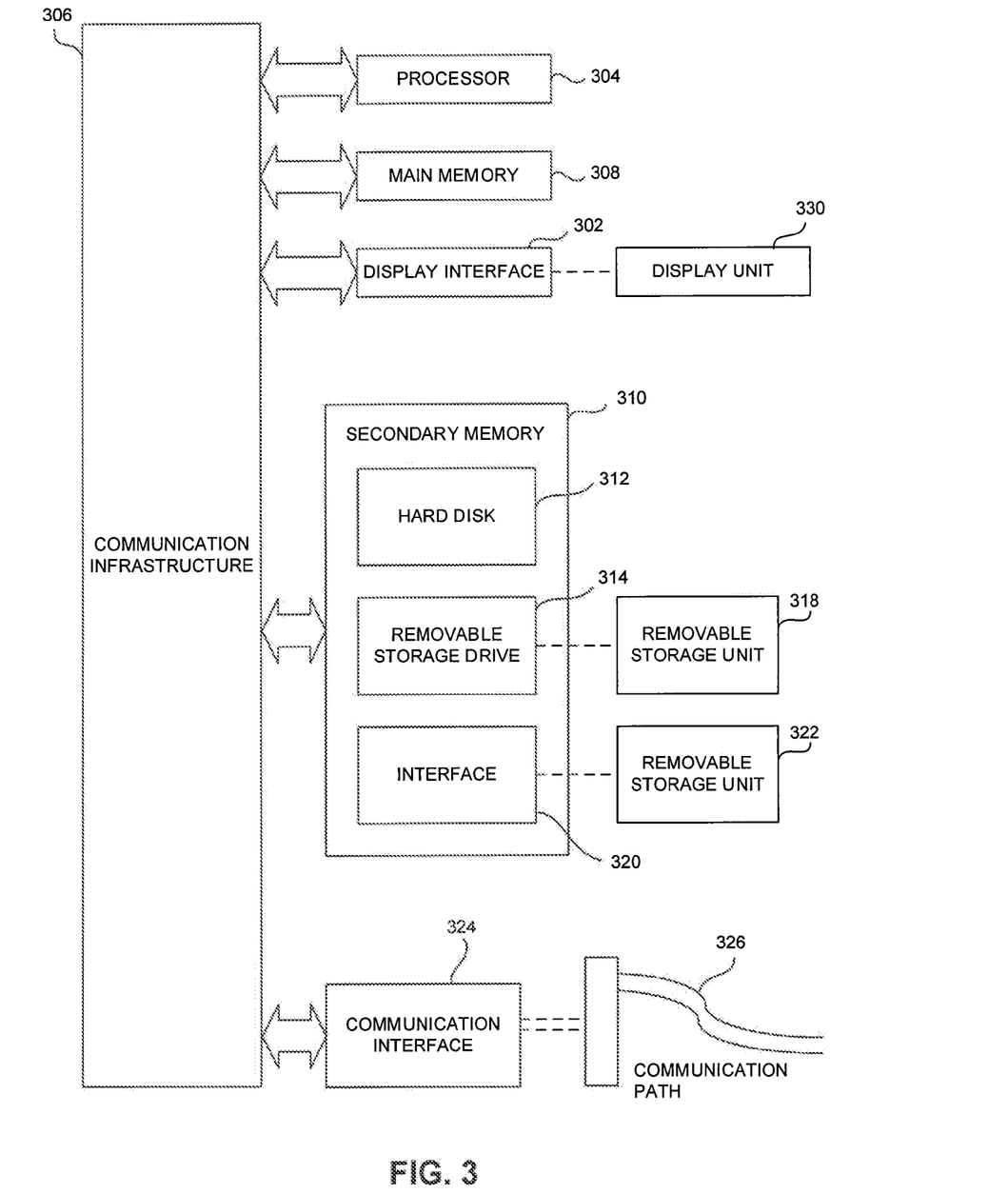
FIG. 3 is a system diagram that can be used to embody or implement embodiments described herein.

FIG. 3 illustrates an example computer system 300 in which embodiments as described herein, or portions thereof, may be implemented as computer-readable code. For example, computing device 102, including portions thereof, may be implemented in computer system 300 using hardware, software, firmware, tangible computer readable media having instructions stored thereon, or a combination thereof, and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 300. After reading this description, it will become apparent to a person skilled in the relevant art how to implement the embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 304 may be a single processor in a multi-core/multiprocessor system, such system may be operating alone, or in a cluster of computing devices operating in a cluster or server farm. Processor device 304 is connected to a communication infrastructure 306, for example, a bus, message queue, network, or multi-core message-passing scheme.

Computer system 300 also includes a main memory 308, for example, random access memory (RAM), and may also include a secondary memory 310. Main memory may include any kind of tangible memory. Secondary memory 310 may include, for example, a hard disk drive 312, and a removable storage drive 314. Removable storage drive 314 may include a floppy disk drive, a magnetic tape drive, an optical disk drive, a flash memory, or the like. The removable storage drive 314 reads from and/or writes to a removable storage unit 318 in a well-known manner. Removable storage unit 318 may include a floppy disk, magnetic tape, optical disk, etc. which is read by and written to by removable storage drive 314. As will be appreciated by persons skilled in the relevant art, removable storage unit 318 includes a computer readable storage medium having stored therein computer software and/or data.

Computer system 300 (optionally) includes a display interface 302 (which can include input and output devices such as keyboards (e.g., 104), mice, etc.) that forwards graphics, text, and other data from communication infrastructure 306 (or from a frame buffer not shown) for display on display unit 330.

In alternative implementations, secondary memory 310 may include other similar I/O ways for allowing computer programs or other instructions to be loaded into computer system 300, such as a removable storage unit 322 and an interface 320. Examples may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between computer system 300 and external devices. Communications interface 324 may include a modem, a network interface (such as an Ethernet card), a communications port, a PCMCIA slot and card, or the like. Software and data transferred via communications interface 324 may be in the form of storage-incapable signals, which may be electronic, electromagnetic, optical, or other signals capable of being received by communications interface 324. These signals may be provided to communications interface 324 via a communications path 326. Communications path 326 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 318, removable storage unit 322, and a hard disk installed in hard disk drive 312. Computer storage medium and computer readable storage medium may also refer to memories, such as main memory 308 and secondary memory 310, which may be memory semiconductors (e.g. DRAMs, etc.). Such mediums include non-transitory storage mediums.

Computer programs (also called computer control logic) are stored in main memory 308 and/or secondary memory 310. Computer programs may also be received via communications interface 324. Such computer programs, when executed, enable computer system 300 to implement embodiments as discussed herein. Where the embodiments are implemented using software, the software may be stored in a computer program product and loaded into computer system 300 using removable storage drive 314, interface 320, and hard disk drive 312, or communications interface 324.

Embodiments also may be directed to computer program products comprising software stored on any computer readable medium. Such software, when executed in one or more data processing device, causes a data processing device(s) to operate as described herein. Embodiments may employ any computer readable storage medium. Examples of computer readable storage mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc.).

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The Summary and Abstract sections may set forth one or more but not all exemplary embodiments contemplated, and thus, are not intended to limit the described embodiments or the appended claims in any way.

Various embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept as described herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described examples, but should be defined only in accordance with the following claims and their equivalents.

What is claimed is:

1. In at least one computer having at least one processor and one memory, a computer-implemented method, performed by the at least one processor, comprising:
   detecting an input event generated by a keyboard operatively connected to a computing device;
   determining that the input event corresponds to an actionable input event of a web application independent of which local application of one or more local applications is active on the computing device as indicated by an input focus, wherein the computing device is communicatively coupled to the web application over a network;
   determining a location of a visual indicator corresponding to the actionable input event on a visual interface of the web application, wherein a selection of the visual indicator corresponds to signaling the web application to perform the actionable input event over the network; and
   selecting the visual indicator at the location of the visual interface; and
   transmitting a signal to the web application corresponding to the selection of the visual indicator.

2. The method of claim 1, wherein the detecting comprises:
   intercepting the input event generated by the keyboard prior to a receipt of the input event by an input driver operating on the computing device, wherein the input driver is configured to provide the input event to the local application that has the input focus.

3. The method of claim 2, further comprising:
   determining that the input event does not correspond to the actionable input event of the web application; and
   providing the input event to the input driver.

4. The method of claim 1, wherein the detecting comprises:
   determining that the input event corresponds to a selection of a multimedia key of the keyboard, wherein the web application is a network-based multimedia application configured to play video or audio files and is operable over the network.

5. The method of claim 4, wherein the input event also corresponds to a particular one of the local applications performing an action, wherein the particular local application is a local multimedia application configured to play video or audio files without access to the network.

6. The method of claim 1, wherein the detecting comprises:
   determining that the input event does not correspond to a selection of an alphanumeric key or a punctuation key of the keyboard.

7. The method of claim 1, wherein the detecting comprises:
   determining that the input event corresponds to at least one of a volume key, a forward key, a reverse key, a play key, or a pause key of the keyboard.

8. The method of claim 1, wherein the determining the location comprises determining that the visual interface is a Javascript interface for the web application.

9. A system comprising:
   a processor,
   a memory;
   an event server configured to detect an input event generated by a keyboard operatively connected to a computing device, the computing device comprising a network port configured to allow the event server to communicate with a network-based application over a network; and
   a web browser operating locally on the computing device and including the network-based application operating within the web browser, wherein the network-based application is configured to perform an actionable input event based on the input event upon a selection, on a visual interface of the web application, of a visual indicator corresponding to the actionable input event,
   wherein the event server is further configured to
      determine a location of the visual indicator on the visual interface of the network-based application within the web browser, and
      provide a signal indicating the selection of the visual indicator at the location over the network port responsive to the input event independent of which of one or more local applications, including the web browser, is active on the computing device as indicated by an input focus.

10. The system of claim 9, wherein the network-based application is a multimedia application that is configured to stream multimedia over the network for playback on the computing device.

11. The system of claim 9, wherein the event server is configured to provide the signal to the web browser to simulate a mouse-click or touch operation at the location on the visual interface for selecting the visual indicator.

12. The system of claim 9, wherein the network-based application and local application are multimedia applications, and the event server is configured to either provide the signal to the network-based multimedia application or the input event to the local multimedia application based on whichever multimedia application most recently had the input focus.

13. The system of claim 9, wherein the event server is further configured to:
   determine that the input event corresponds to a selection of a multimedia key of the keyboard, wherein the network-based application is a multimedia application communicating with the computing device via the network port; and
   provide the signal for the selection of the visual indicator to the web browser, wherein the actionable input events corresponds to performing an action associated with the multimedia key.

14. The system of claim 13, wherein the event server is further configured to:
   determine that the input event corresponds a selection of at least one of a volume key, a forward key, a reverse key, a play key, or a pause key of the keyboard.

15. The system of claim 9, wherein the event server is configured to:
   intercept the input event generated by the keyboard prior to a receipt of the input event by an input driver operating on the computing device, wherein the input driver is configured to provide the input event to the active local application as indicated by the input focus.

16. The system of claim 15, wherein the event server is further configured to:
   determine that the input event does not correspond to the actionable input event of the network-based application; and
   provide the input event to the input driver.

17. The system of claim 9, wherein the event server is configured to determine that a key code associated with the input event corresponds to a key code associated with the actionable input event.

18. A non-transitory computer-readable storage medium storing instructions that when executed by a computing device cause the computing device to perform a method comprising:

detecting an input event generated by a keyboard operatively connected to the computing device, wherein the input event corresponds to a selection of a multimedia key of the keyboard;

determining that the input events corresponds to both:
- an action of a multimedia application operating locally on the computing device independent of which of a plurality of local applications on the computing device is active as indicated by an input focus, and
- an actionable input event of a network-based multimedia application, wherein the computing device is communicatively coupled to the network-based multimedia application over a network;

determining a location of a visual indicator corresponding to the actionable input event on a visual interface of the network-based multimedia application, wherein a selection of the visual indicator provides a signal for the network-based application to perform the actionable input event; and providing a signal indicating the selection of the visual indicator at the location on the visual interface in lieu of providing the input event to the multimedia application operating locally on the computing device.

19. The non-transitory computer-readable storage medium of claim 18, wherein the detecting comprises:
determining that a key code corresponding to the input event corresponds to the multimedia key.

20. The non-transitory computer-readable storage medium of claim 18, wherein the determining that key code corresponds to the multimedia key comprises:
determining that the key code corresponds to at least one of a selection of a volume key, a forward key, a reverse key, a play key, or a pause key of the keyboard.

21. The non-transitory computer-readable storage medium of claim 18, wherein the detecting comprises:
determining that the network-based multimedia application is not communicatively coupled to the computing device; and
providing the input event to the multimedia application operating locally on the computing device in lieu of providing the signal indicating the selection of the visual indicator.

\* \* \* \* \*